(12) United States Patent
Gibbons

(10) Patent No.: US 6,557,546 B1
(45) Date of Patent: May 6, 2003

(54) HEAT SHIELD FOR PORTABLE GAS BARBEQUE

(75) Inventor: Jeffrey R. Gibbons, Crystal Lake, IL (US)

(73) Assignee: Uniflame Corporation, Winston-Salem, NC (US)

( * ) Notice: Subject to any disclaimer, the term of this patent is extended or adjusted under 35 U.S.C. 154(b) by 0 days.

(21) Appl. No.: 09/716,490

(22) Filed: Nov. 20, 2000

(51) Int. Cl.[7] ................................................. A47J 37/07
(52) U.S. Cl. ...................................... 126/41 R; 99/401
(58) Field of Search ........................... 126/41 R, 25 R; 99/401, 425, 446, 447

(56) References Cited

U.S. PATENT DOCUMENTS

| | | | |
|---|---|---|---|
| 4,446,846 A | 5/1984 | Hahn | |
| 4,587,948 A | * 5/1986 | Haglund | .................... 126/41 R |
| 4,627,408 A | 12/1986 | Schlosser | |
| 5,038,748 A | 8/1991 | Lockwood et al. | |
| 5,279,277 A | 1/1994 | Barker | |
| 5,355,868 A | 10/1994 | Haen | |
| 6,267,047 B1 | * 7/2001 | Mosher et al. | ................ 99/339 |

* cited by examiner

Primary Examiner—Sara Clarke
(74) Attorney, Agent, or Firm—Greer, Burns & Crain, Ltd.

(57) ABSTRACT

A portable gas grill that rests on a substrate is disclosed. The grill includes a grill body having a floor, a burner and a heat shield including a substantially planar main portion and having at least one elongate, covered air channel. The heat shield is positioned between the burner and the floor. The heat shield minimizes heat transmission to the substrate while permitting airflow to the burner.

18 Claims, 2 Drawing Sheets

HEAT SHIELD FOR PORTABLE GAS BARBEQUE

BACKGROUND OF THE INVENTION

This invention relates to portable barbecue grills, and addresses the problem of reducing the amount of heat that is transferred from the floor of a portable grill to the substrate upon which it rests. More specifically, the invention discloses a heat shield that rests between the burner and floor of the grill, reflecting much of the radiant heat upwards toward the food grid.

Portable cooking grills have become very popular as outdoor cooking devices, generally burning pressurized gas from a burner or charcoal on a grate as the heat source. When preparing for cooking, the grill is placed on a substrate, such as a picnic table, and the heat source is ignited. Heat will radiate downward from the heat source, as well as upward, causing heating of the floor and lower walls of the grill body. The substrate will also become hot due to both conduction and radiation of heat from the floor of the grill. During cooking, the temperature of the substrate can reach upwards of 130° F. to 140° F. above the ambient temperature.

Standards proposed by the American Gas Association ("AGA") and the Canadian Standards Association ("CSA") require that portable grills heat the substrate surface no more than 90° F. above ambient temperature. Meeting this standard involves delicately balancing the design criteria of blocking the heat flow, while permitting sufficient airflow for supporting combustion.

It is therefore an object of this invention to provide an improved heat shield for a portable grill that minimizes heat transfer to the substrate surface.

It is still another object of this invention to provide an improved heat shield for a portable grill that meets the AGA standard, providing sufficient air flow to promote efficient combustion.

It is yet another object of this invention to provide an improved heat shield for a portable grill that features a construction intended to minimize warping during use.

SUMMARY OF THE INVENTION

These and other objects are met or exceeded by the present invention which features a heat shield to deflect radiant heat upward away from the floor of the grill. The present shield also acts as a heat sink, allowing heat to be dissipated by the intake air entering the grill under the heat shield, and flowing upwards around the shield to reach the heat source for combustion.

More specifically, the present invention provides a portable gas grill that rests on a substrate. The grill includes a grill body having a floor, a burner and a heat shield including a substantially planar main portion and having at least one elongate, covered air channel. The heat shield is positioned between the burner and the floor to minimize heat transmission to the substrate. Spacing of the shield above the floor allows better air circulation through vent holes in the floor of the grill. Airflow to the burner is maintained through the heat shield, preferably through the use of an air channel that aligns with the vent holes on the floor of the grill body.

Use of this heat shield reflects heat away from the floor of the grill, thus minimizing the temperature increase of the substrate due to conduction and radiation of heat from the floor of the grill. The shield also acts as a heat sink, absorbing heat from the heat source and dispersing it to the surroundings while minimizing the amount of heat that is transferred to the grill floor. When the grill floor is cooler, it is less likely to damage the substrate due to heat.

This invention also meets the AGA standards for both substrate temperature rise and carbon monoxide levels. Support of the heat shield off the surface of the grill floor, as well as the air channel design, maximizes air flow through the air channels, keeping carbon monoxide levels very low. This feature also allows the maximum dissipation of heat from the shield in other directions. As fresh combustion air at ambient temperature enters the grill from the vent holes under the shield, the air contacts the shield, transferring heat to the air by conduction and convection. Passing by the burner, the temperature of the air is increased further, making it much lighter than the incoming combustion air. The hot air then passes by or circulates around the food. Upon removal of the grill lid, the hot air escapes from the grill. Thus, heat from the shield is eventually released to the atmosphere by convection due to the airflow pattern around the heat shield, and radiation from other portions of the grill body.

DETAILED DESCRIPTION OF THE DRAWINGS

Figure 1:
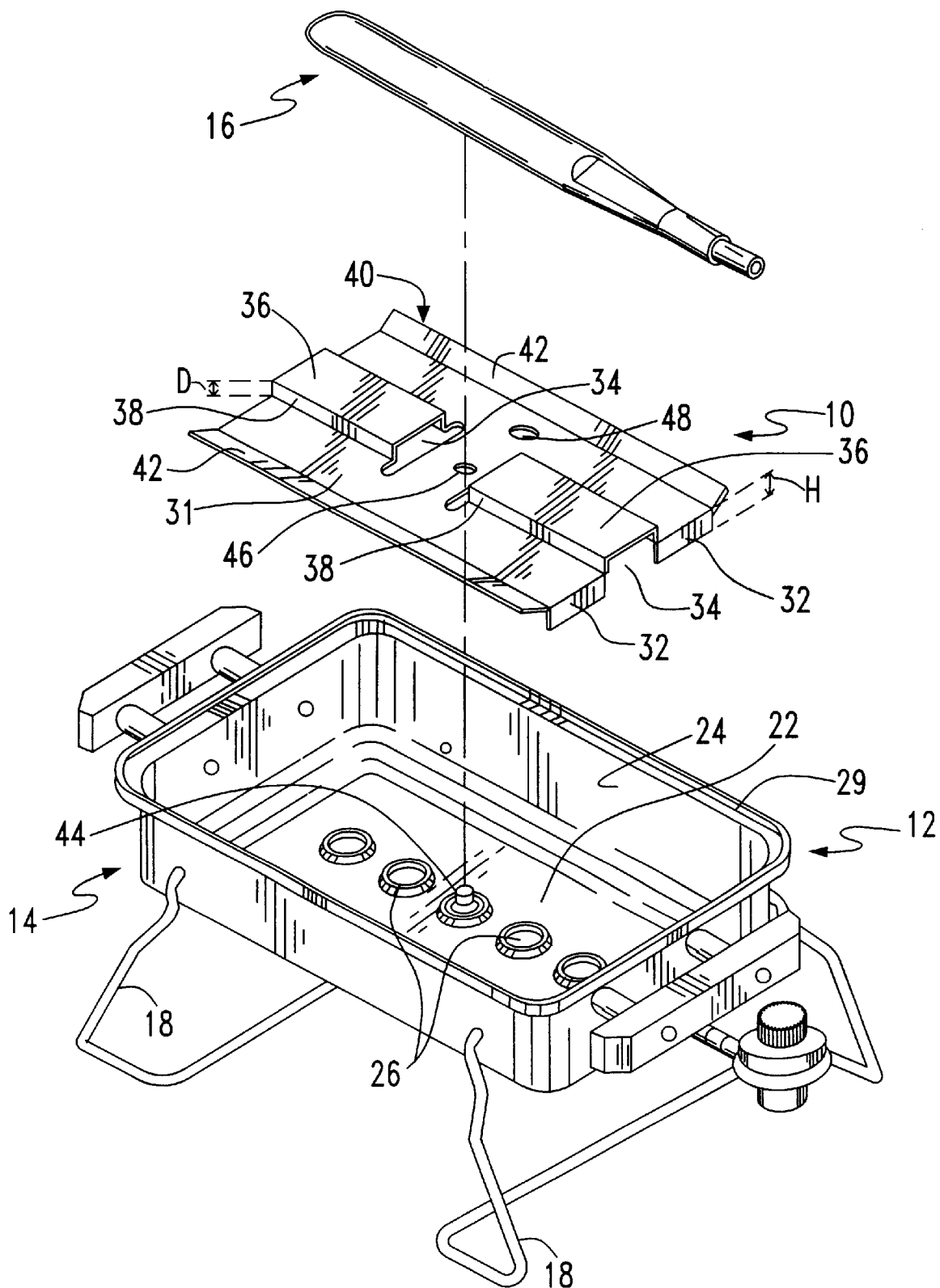
FIG. 1 is a fragmentary exploded, perspective view of a barbecue grill and the present heat shield.

Referring now to FIGS. 1–4, a heat shield, generally designated 10, is designed to minimize transference of heat from a portable grill, generally designated 12, to the substrate 13 (FIG. 2) upon which it rests.

The heat shield 10 is preferably made of a material that will withstand temperatures in the bottom of the grill 12 without cracking or breaking. Metals, ceramics, and even some high temperature plastics are contemplated as suitable materials. Preferably the shield 10 is made of a heat conducting material that easily reflects and/or dissipates the generated heat to the surrounding air. Metals are the preferred material for construction of the heat shield 10, with steel being the preferred metal. A coating to protect the metal from corrosion at high temperatures is preferably used. Most commonly, steel is coated with another metal that is more reactive in the electromotive series, so that, in the presence of an electrolyte, such as humid air, the coating metal rather than the steel is affected. Zinc (galvanizing) or aluminum coating of the steel are the most preferred coatings, but any coating may be used that will reduce rapid corrosion that is possible from high temperature oxidation.

Figure 2:
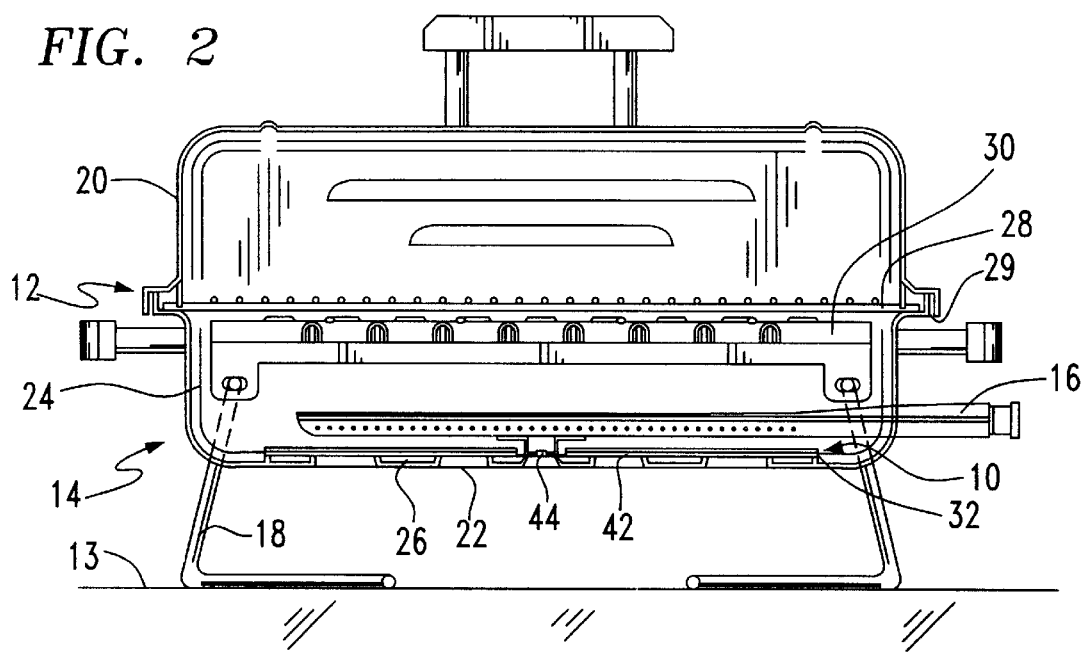
FIG. 2 is a vertical cross-section of a barbecue grill with the present heat shield installed.

The heat shield 10 is designed to fit inside the portable grill 12, as shown in FIG. 2. The grill 12 has a grill base or body, generally designated 14, and a heat source such as a burner, generally designated 16. Legs 18 depend from the body 14 and support the grill 12 off the surface of the substrate 13 upon which the grill rests during use. Preferably, the legs 18 also are configured and shaped to swivel, allowing them to pivot around to hold a lid 20 securely on the grill 12 during transport from one location to another.

Components of the grill body 14 include a floor 22 and one or more walls 24 which form a container shape. In the preferred embodiment, the body 14 is fabricated, as by stamping, from a single piece of metal. Thus, the walls 24 are integrally joined to the floor 22. However, bodies fabricated of separate walls 24 and floor 22 are also contemplated. Often the grill body will be rectangular, but any shape is suitable, including square and circular designs.

One or more air vents 26 are generally located in the floor 22 or very low on the walls 24, providing fresh air to support combustion of the cooking fire. Most often, the heat source 16 will be a combustible gas, such as propane, butane, white gas and the like, that is fed to the grill 12 through the burner 16. Although designed for use with the gas burner 16, use of the heat shield 10 with charcoal supported on a grate (not shown) as the heat source 16 is also contemplated. The burner 16 is spaced an appropriate distance from the floor 22 of the grill 12 by any suitable means. A food support grate 28 is suspended above the burner 16 by a shelf or ledge 29 formed in the body 14. A heat plate 30 is optionally placed between the food support grate 28 and the burner 16. Heat from the burner 16 is distributed by warming of the heat plate 30. The heat plate 30 also protects the burner 16 from drips or splatters of grease or juices from the cooking food.

Figure 3:
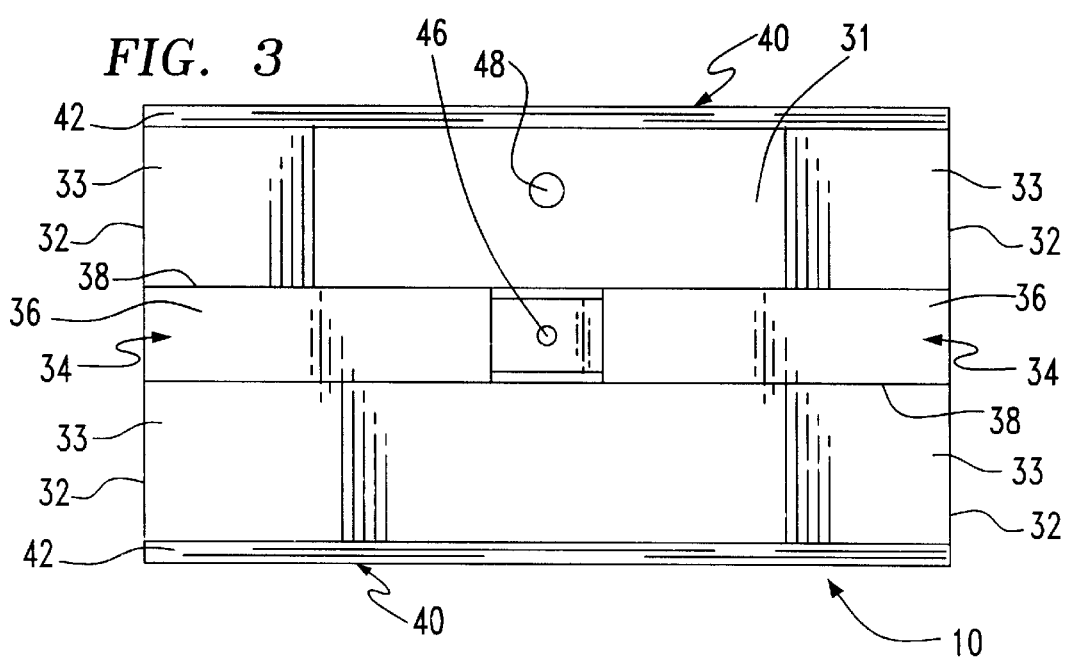
FIG. 3 is a top view of the present heat shield.

Referring to FIGS. 1 and 3, the heat shield 10 has a main portion 31 that is substantially planar. Vertical standoffs 32 support the main portion 31 off the floor 22 of the grill 12. In the preferred embodiment, the standoffs 32 depend from ends 33 of the main portion 31 and are fabricated by bending over designated areas of the main portion. However, other constructions are contemplated, including providing separate standoffs and securing them to the main portion by welding, fasteners, or adhesives. The height, H, of the standoffs 32 is very important to the function of the heat shield 10. If the standoffs 32 place the main portion 31 too close to the burner 16, it will warp during use, making the shield 10 unsightly and changing the airflow patterns. However, airflow is substantially reduced if the main portion 31 is too close to the floor 22, diminishing flow from the air vents 26. Preferably, the standoffs 32 hold the main portion 31 at least one-quarter inch off the grill floor 22.

At least one air channel, generally designated 34, is located immediately over the air vents 26 when the heat shield 10 is placed in the body 14. The air channels 34, two of which are provided in the preferred embodiment, are vertically displaced above the main portion 31 of the heat shield 10. This additional space provides extra clearance around the air vents 26, allowing for good air flow and ensuring that there is sufficient air circulation for efficient combustion and dissipation of heat away from the heat shield 10. Preferably, each air channel 34 covers a plurality of vents 26 and has an elongate, inverted "U" shape. However, other shapes are contemplated depending on the shape of the grill body 14 and the placement of the air vents 26. To promote proper air circulation, the air channel 34 is preferably open on at least two sides, allowing air to flow through it. This configuration also permits lateral flow of air between a plurality of the air channels 34 to accommodate various airflow patterns. Although the air channel 26 may be fabricated separately and attached to the main portion 31, it is preferably formed as an integral part of the main planar portion.

The preferred channel 34 has a U-shaped cross section, best shown in FIG. 1. A roof 36 and one or more supporting sides 38 form the "U". The supporting sides 38 hold the roof 36 of the air channel 34 a distance "D" from the floor 22 of the grill 12 that is above the height of the vertical standoffs 32. Preferably, the height, D, of the supporting sides 38 is approximately equal to the height, H, of the vertical standoff 32, making the roof 36 about twice the distance from the floor 22 than the main portion 31.

In such close proximity to a heat source 16, the heat shield 10 has a tendency to warp if it is not reinforced in certain places. If the heat shield 10 is rectangular, it will tend to warp along the longer sides of the rectangle. This may be prevented, for example, by the addition of strengthening ribs, generally designated 40, along the length of the main portion 31. Generally, the ribs 40 will be parallel to the air channel 34, since the air vents are often positioned in a row down the longitudinal axis of the floor. However, the orientation of the ribs 40 with respect to the air channel 34 is not critical, and a variety of orientations is contemplated. A few examples of the many types strengthening ribs 40 that are possible include reinforcing strips, a small stamped channel down the length of the shield, a pleated portion, or corrugations.

Figure 4:
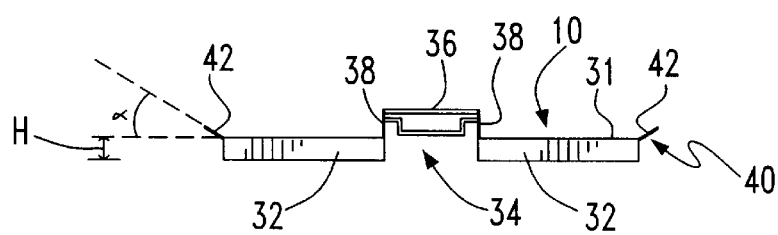
FIG. 4 is an end view of the present heat shield.

Referring now to FIG. 4, a preferred type of strengthening rib 40 for preventing warping includes the addition of fins 42 that extend along the length of the heat shield 10 and are inclined upward away from the plane of the main portion 31. Preferably, the main portion 31 and the fins 42 are sized and configured as to allow space between the fins and the wall 24. This space allows better air circulation over and around the heat shield 10. Use of a heat shield 10 or fins 42 that rest in contact with wall 24 is also contemplated. Upward inclination of the fins 42 is intended to mean that the fins are angled from the main planar portion 31 away from the plane of the floor 22. The angle of the fin with respect to the main planar portion, $\alpha$, is best shown in FIG. 4, and should be less than 90°. Preferably, $\alpha$ is greater than 20° and less than 40°. Most preferably, $\alpha$ is about 30°.

The burner 16 is preferably attached to the floor 22 of the grill 12 with a fastener 44, shown in FIG. 1. Accordingly, in the preferred embodiment, the heat shield 10 has a mounting hole 46 for ease in installing the heat shield and securing it in the body 14. Preferably, the mounting hole 46 will align with the fastener 44 so that the fastener secures both the shield 10 and the burner 16 to the body 14. In the most preferred embodiment, the mounting hole 46 is located between the two air channels 34. The heat shield 10 also preferably has a match hole 48, for facilitating lighting of the burner 16, which is aligned with a similar hole on the floor 22 of the grill 12.

While a particular embodiment of the heat shield for a portable grill has been shown and described, it will be appreciated by those skilled in the art that changes and modifications may be made thereto without departing from the invention in its broader aspects and as set forth in the following claims.

What is claimed is:

1. A portable gas grill that rests on a substrate, comprising:
a grill body having a floor;
a burner mounted within said body; and,
a heat shield comprising a substantially planar main portion having at least one elongate, covered air channel, and being positioned between said burner and said floor to minimize heat transmission to the substrate while permitting air flow to said burner, said air channel being generally U-shaped.

2. The grill of claim 1, wherein said main portion is spaced a first distance from said floor and said air channel is spaced a second distance from said floor.

3. The grill of claim 2, wherein said first distance is about half of said second distance.

4. The grill of claim 2, wherein said first distance is at least one-quarter of an inch.

5. The grill of claim 1, wherein said at least one air channel has two open ends.

6. The grill of claim 2, having at least two of said air channels configured for allowing lateral flow of air between them.

7. The grill of claim 2, wherein said heat shield further comprises one or more strength ribs running parallel to said air channel.

8. The grill of claim 7, wherein said strength ribs comprise fins that extend along the length of said heat shield and incline upward away from said main planar portion.

9. The grill of claim 8, wherein said fins incline upward at an angle from about 20° to about 40° from said main planar portion.

10. The grill of claim 9, wherein said grill body further comprises one or more walls, and wherein said fins contact said walls.

11. The grill of claim 1, further comprising a fastener for mounting said burner to said floor, and wherein said heat shield further comprises a mounting hole that aligns with said fastener between said burner and said floor.

12. The grill of claim 1, wherein said heat shield is made of aluminized or galvanized metal.

13. The grill of claim 1 further comprising a first match light hole, and wherein said heat shield further comprises a second match light hole such that said first match light hole aligns with said second match light hole.

14. A heat shield for use in a portable grill having a floor, a heat source and a fastener for mounting the heat source to the floor, said heat shield comprising:

a substantially planar main portion;

a plurality of elongate covered air channels on said main portion being configured to allow lateral air flow between them, each of said air channels having two open ends, said main portion having at least one standoff for spacing said main portion a first distance from the floor of the grill, and said air channel being spaced a second distance from the floor;

at least one strength rib running parallel to said air channels, extending along the length of said heat shield and inclining upward away from said main planar portion; and a mounting hole that aligns with the fastener between the heat source and the floor.

15. The heat shield of claim 14, wherein said at least one fin inclines upward at an angle from about 20° to about 40° from said main planar portion.

16. The heat shield of claim 14, wherein said elongate covered air channel is generally U-shaped.

17. The heat shield of claim 14, wherein said first distance is about half of said second distance.

18. The heat shield of claim 17 wherein said first distance is at least one-quarter of an inch.

* * * * *